US005790948A

United States Patent [19]
Eisfeld et al.

[11] Patent Number: 5,790,948
[45] Date of Patent: *Aug. 4, 1998

[54] METHOD AND APPARATUS FOR TRANSMITTER FOR UNIVERSAL GARAGE DOOR OPENER

[75] Inventors: Eric Eisfeld, San Leandro; James Long, Sunnyvale; Gordon Force, San Jose, all of Calif.

[73] Assignee: Universal Devices

[*] Notice: The term of this patent shall not extend beyond the expiration date of Pat. No. 5,564,101.

[21] Appl. No.: 720,741

[22] Filed: Oct. 2, 1996

Related U.S. Application Data

[63] Continuation of Ser. No. 505,652, Jul. 21, 1995, Pat. No. 5,564,101, which is a continuation of Ser. No. 89,027, Jul. 9, 1993, abandoned.

[51] Int. Cl.⁶ .................................................. H04B 1/04
[52] U.S. Cl. ................. 455/352; 455/151.2; 340/825.72
[58] Field of Search .......................... 455/151.1–151.2, 455/151.4, 152.1, 352, 127, 92–93, 192, 103, 115, 120, 122–123, 73, 169.2, 180.4, 191.2, 193.3; 340/825.57, 825.58, 825.69, 825.71, 825.72, 825.78, 825.73, 825.76

[56] References Cited

U.S. PATENT DOCUMENTS

| | | | |
|---|---|---|---|
| 3,445,848 | 5/1969 | Goldstein | 340/825.72 |
| 3,522,536 | 8/1970 | Reynolds | 340/825.72 |
| 3,831,175 | 8/1974 | Mazalas | 340/825.72 |
| 3,835,454 | 9/1974 | Palmieri et al. | 340/825.73 |
| 3,965,336 | 6/1976 | Grohmann | 455/169.2 |
| 4,089,184 | 5/1978 | Beitner | 62/3 |
| 4,218,681 | 8/1980 | Hormann | 340/825.72 |
| 4,360,801 | 11/1982 | Duhame | 340/825.72 |
| 4,385,296 | 5/1983 | Tsubaki et al. | 340/825.72 |
| 4,387,346 | 6/1983 | Fackler | 455/127 |
| 4,529,980 | 7/1985 | Liotine et al. | 340/825.52 |
| 4,709,404 | 11/1987 | Tamura et al. | 455/73 |
| 4,747,161 | 5/1988 | Hulsey et al. | 455/127 |
| 4,771,283 | 9/1988 | Imoto | 455/352 |
| 4,808,995 | 2/1989 | Clark et al. | 340/825.69 |
| 4,864,108 | 9/1989 | Hamada et al. | 235/379 |
| 4,890,108 | 12/1989 | Drori et al. | 341/176 |
| 4,904,993 | 2/1990 | Sato | 340/825.72 |
| 4,912,463 | 3/1990 | Li | 340/825.69 |
| 5,109,221 | 4/1992 | Lambropoulos et al. | 340/825.69 |
| 5,255,227 | 10/1993 | Haeffele | 365/200 |
| 5,319,797 | 6/1994 | Salter et al. | 340/825.72 |
| 5,564,101 | 10/1996 | Eisfeld et al. | 455/352 |

FOREIGN PATENT DOCUMENTS

| | | | |
|---|---|---|---|
| 2744057 | 4/1979 | Germany | 455/151.2 |
| 2805896 | 8/1979 | Germany | 341/1.76 |
| 3720254 | 1/1989 | Germany . | |
| 2222288 | 2/1990 | United Kingdom . | |

*Primary Examiner*—Nguyen Vo
*Attorney, Agent, or Firm*—David H. Jaffer

[57] ABSTRACT

A universal remote control transmitter for use with garage door openers including a number of switches whereby a user can program a transmitted modulation format and carrier frequency, and a controller for scanning the switches to determine the user programmed selections. The controller, in response to the programmed selections, outputs the required modulation to a selected transmitter, as well as direction to fine tune the transmitter to the particular carrier frequency. Also included is a power sensor circuit that responds to a change in power supply voltage by adjusting the modulation to maintain a constant peak transmitter output power.

4 Claims, 7 Drawing Sheets

1

METHOD AND APPARATUS FOR TRANSMITTER FOR UNIVERSAL GARAGE DOOR OPENER

This is a continuation of copending application(s) Ser. No. 08/505,652 filed on Jul.21, 1995, Pat. No. 5,504,101 which is a continuation of Ser. No. 08/089,027 filed on Jul. 9, 1993, abandoned.

BACKGROUND OF THE INVENTION

1. Field of the Invention

The present invention relates generally to remote control devices, and more particularly to radio frequency transmitters for remote control of garage door openers, and still more particularly to a universal transmitter for a garage door opener.

1. Description of the Prior Art

Remote control of garage door openers has become common, with numerous manufactures supplying a variety of devices. For security purposes, separate carrier frequencies and a plurality of modulation codes are used for each manufactured product line. The many variables necessary for security makes manufacture expensive, and especially for smaller distributors, makes parts stock a burden.

Efforts have been made to increase the number of receivers a transmitter can accommodate, as in Drori et al. U.S. Pat. No. 4,890,108 wherein the manufacturer stores predetermined modulation codes, which can be recalled by the user. This is accomplished through the addition of an EEPROM in cooperation with the usual microprocessor. The invention does not allow for user programming of modulation format or for adjustment of the carrier frequency. Methods whereby the user code can be programmed by the owner are also disclosed in Liotine et al. U.S. Pat. No. 4,529,980.

In summary, the prior art deals primarily with user code flexibility and ease of operation, rather than with a universal transmitter having capability for selectably varying the carrier frequency. These devices have increased the number of different transmitters on the market, but have not realized a universal transmitter compatible with most garage door opener receivers.

SUMMARY OF THE INVENTION

It is therefore an object of the present invention to provide a universal radio frequency (RF) transmitter for a garage door opener wherein the user has a large selection of RF carrier frequencies from which to choose.

It is a further objective to provide a universal transmitter for a garage door opener, including in combination a means for user programming of modulation code.

A still further objective is to provide a means of compensating for battery voltage reduction to maintain constant carrier output power.

It is another objective to provide a transmitter for a garage door opener that can be user programmed to operate a greater variety of garage door opener receivers.

Briefly, a preferred embodiment of the present invention includes a transmitter housing containing the following elements, including a number of switches whereby a user can program a transmitted modulation format and carrier frequency. Also included is a controller comprising a microprocessor or custom integrated circuit for scanning the switches to determine the user programmed selections. This information is then processed by the microprocessor/custom integrated circuit to output the selected modulation to a selected transmitter, and to fine tune the transmitter to the particular required carrier frequency. Also included in the present invention is a power sensor circuit that responds to a change in power supply voltage by adjusting the modulation to maintain a constant peak transmitter output power.

The advantages of the present invention include a transmitter that allows for extensive user programming of modulation and carrier frequency.

Another advantage of the present invention is that a distributor need not stock every brand of remote transmitter in order to have a unit in inventory that will meet a particular customer's need. This will greatly reduce inventory costs.

A still further advantage is that battery life is extended by a power sensing device that compensates for reduced battery voltage.

These and other objects and advantages of the present invention will no doubt become apparent to those skilled in the art after having read the following detailed description of a preferred embodiment illustrated in the several figures of the drawing.

IN THE DRAWING

DETAILED DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
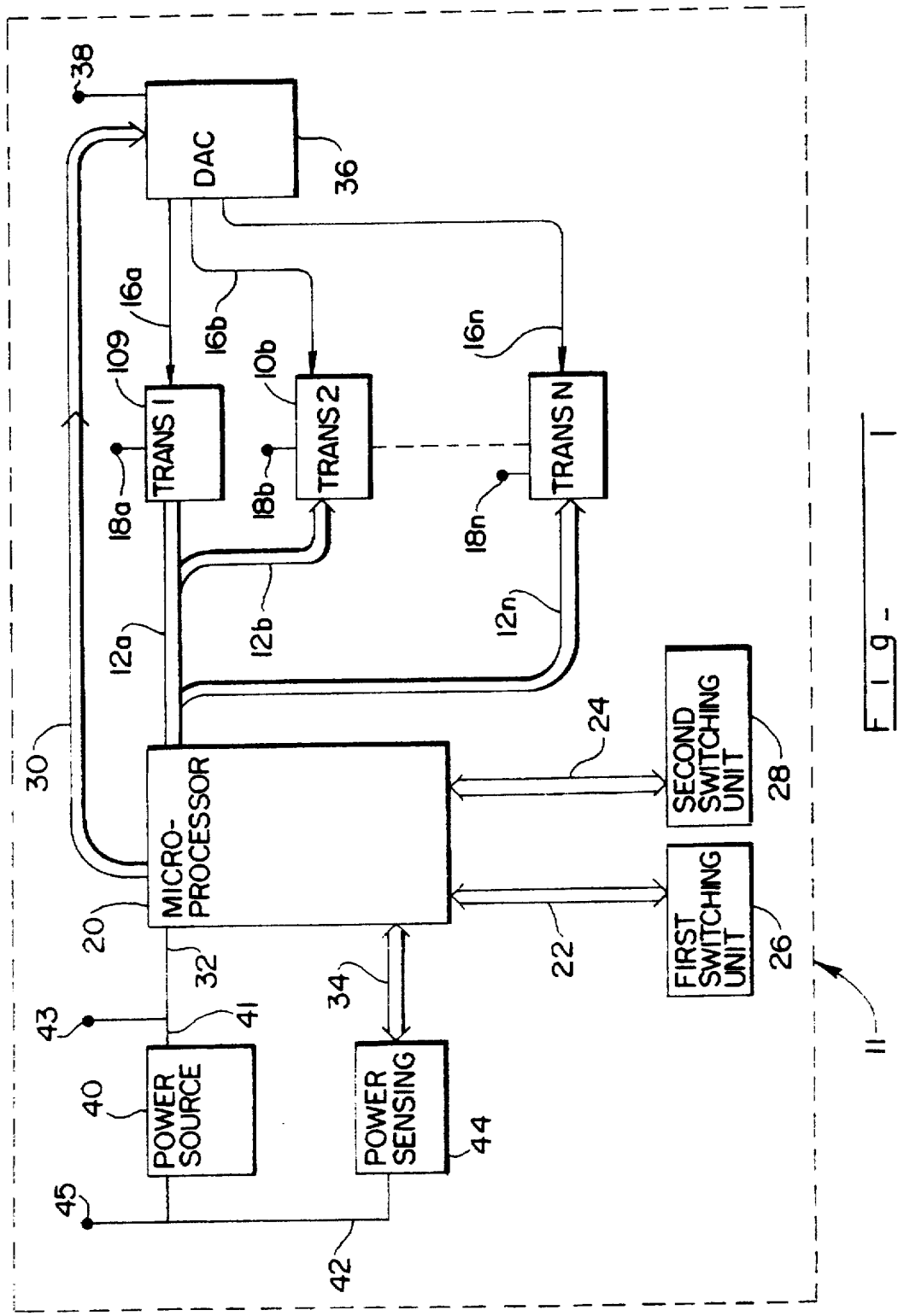
FIG. 1 is a block diagram of a preferred embodiment of the present invention.

Referring now to FIG. 1, there is shown a block diagram of a preferred embodiment of the present invention. There is a transmitter housing, schematically illustrated as item 11, for containing the following described elements. There are a plurality of RF transmitters designated as 10a, 10b, 10c, . . . 10n, each having respective signal input bus lines 12a–n, bias lines 16a–n, and supply inputs 18a–n associated therewith. The total number, n, of transmitters 10a–n selected for use in the present invention will vary in dependence upon the number of different receiver frequencies desired to be covered, since each transmitter 10a–n will only communicate with one receiver operating on a particular receiver carrier frequency.

Signal input bus lines 12a–n transmit digital data from the microprocessor assembly 20 to the respective transmitters 10a–n. Bias lines 16a–n transmit analog data from the digital to analog converter (DAC) 36 to the respective transmitters 10a–n. Also provided is a controller comprising a microprocessor assembly 20 having first and second switching unit bus lines 22 and 24 connected to a first switching unit 26 and a second switching unit 28, respectively, a digital frequency output bus 30 connected to the DAC 36, a power source input 32 connected to a power source 40 and a power sensing bus 34 connected to a power sensor 44.

The digital to analog converter (DAC) 36 includes a voltage supply input 38, and which receives digital frequency data generated by the microprocessor assembly 20 along the digital frequency bus 30 and outputs the frequency data in analog form to the transmitters 10a–n via the respective bias lines 16a–n. The power source 40 is provided with a regulated output 41 to input 32 of microprocessor assembly 20, and further includes an output 43 to all +5 v system input terminals as required. There is also an unregulated output 45 from a battery source that provides power to transmitters 10a–n. Power sensor 44 has an input 42 sampling the battery voltage at port 45, and a bus line 34 to the microprocessor assembly 20. The power source 40 preferably also has a supply line to the DAC 36 (not shown).

The function of the first switching unit 26 is to present operator selected switch settings to the microprocessor assembly 20, which operator selected settings determine a particular modulation code to be transmitted. The second switching unit 28 similarly has multiple settings that are selectively set by the operator. The selected settings of the second switching unit 28 are interpreted by the microprocessor assembly 20 to determine a particular carrier frequency for transmission.

In operation, the microprocessor assembly 20 scans the first switching unit 26 and second switching unit 28 to determine the selected switch settings which serve as a key, i.e. an access code to modulation formats that are preprogrammed interior to the microprocessor assembly 20. In response, the microprocessor 20 generates the desired modulation signal which is outputted on bus lines 12a–n, and further selects a particular line within bus 12a–n to transmit the signal to a respective one of transmitters 10a–n. In addition, and as an optional feature of the present invention, the microprocessor assembly 20 may further respond to the second switching unit 28 by generating and transmitting a digital signal along a particular selected line of bus 30 to the DAC 36 which in turn functions to output a bias on lines 16a–n to tune the transmitter 10 to the specific required frequency.

Each transmitter 10a–n provides a particular radio frequency (RF) carrier frequency. Accordingly, any number of transmitters may be included as desired in order to permit operation with a receiver having the same particular carrier frequency. In operation, the selected one of transmitters 12a–n receives a modulation signal from the microprocessor assembly 20 via its respective one of bus lines 12a–n. The modulation signal manipulates the carrier signal by turning the selected transmitter on and off according to the modulation code of a specific garage door opener receiver, as selected by an operator through the setting of the first and second switching units 26 and 28.

The power source 40 may be of any known derivation for supplying the required voltage and current to the various components. In a preferred embodiment the power source 40 comprises a battery and voltage regulator combination, to be more fully detailed in the following.

The power sensing circuit 44 is an optional device that senses a battery source voltage and provides means for altering the modulation signal so as to maintain a constant transmitter power output as a function of supply voltage. This allows the application of a battery supply voltage directly to the transmitter supply terminals 18a–n without loss of performance with battery aging, and eliminates the power loss that would normally occur if the source were first run through a voltage regulator.

In operation, a user determines the transmitter type and user code required to activate a particular garage door opener receiver, the transmitter type identifying the carrier frequency, and the user code defining the modulation. The first switching unit 26 and second switching unit 28 are then set to communicate the carrier frequency and modulation requirements. The microprocessor assembly 20 scans switching units 26 and 28 to determine their settings, and in response generates the selected modulation and sends it via bus lines 12a–n to the corresponding one of transmitters 10a–n configured to operate at the required frequency. In practice, transmitter frequencies are often grouped in relatively narrow "bands", each "band" containing a number of distinctly separated carrier frequencies. The present invention provides an efficient method for generating these frequencies by tuning a particular selected transmitter within a given "band" or bandwidth. Various methods for tuning transmitter frequencies with applied tuning voltage or current are well known to those skilled in the art, and these methods are to be considered as included within the scope of the invention. FIG. 1 shows a DAC 36, which responds to digital signals within bus line 30, and outputs transmitter tuning signals on bias lines 16a–n.

Figure 2:
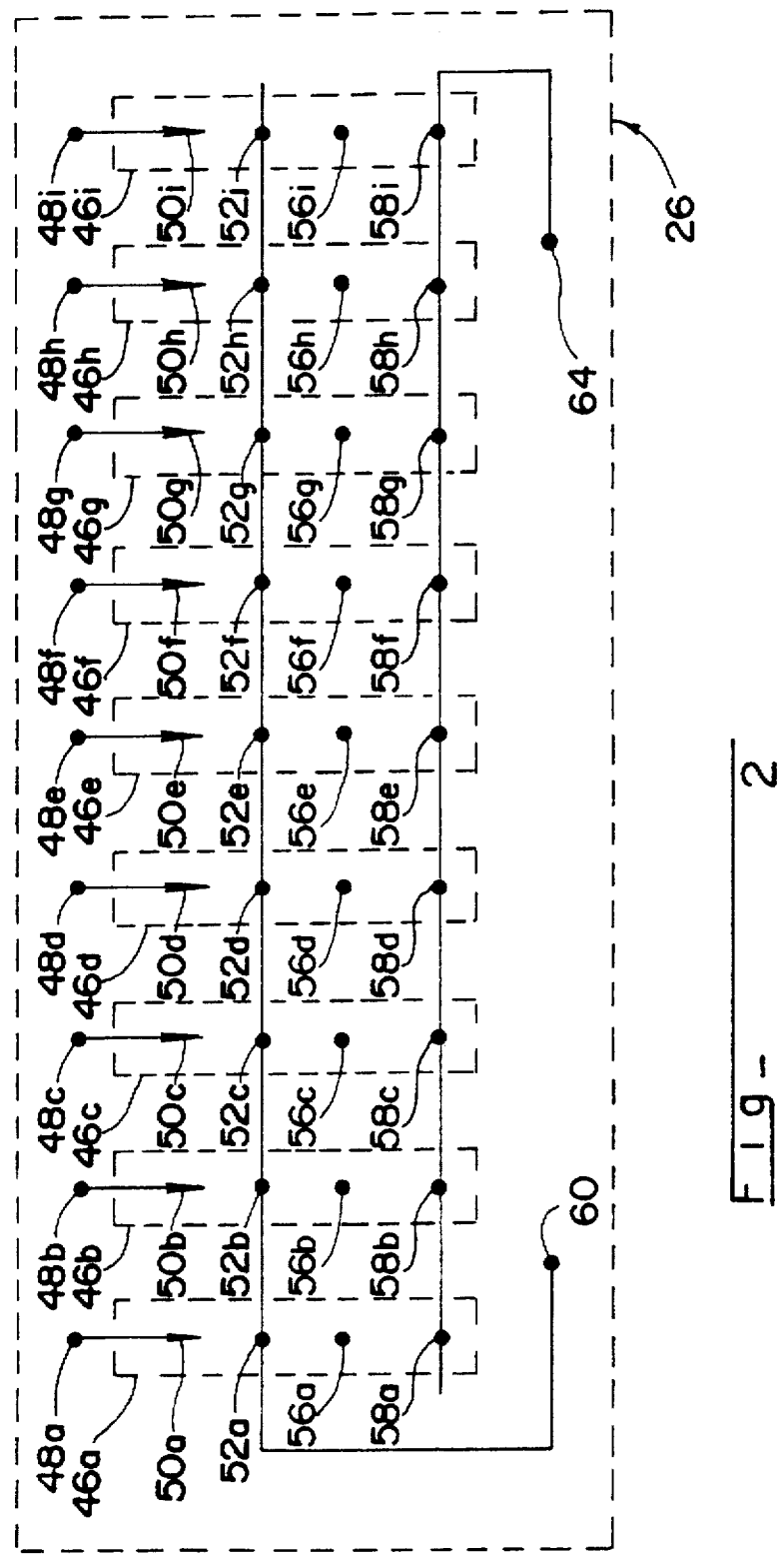
FIG. 2 is a schematic of a first switching unit.

Referring now to FIG. 2, the first switching unit 26 is shown schematically to include a plurality of single pole, triple throw switches 46a–i. In the preferred embodiment, nine triple throw switches are used, but it is understood that any greater or lessor number of switches may be used as desired. Each switch 46 has associated therewith a terminal 48a–i connected to a moveable contact 50a–i, which is adjustable to engage a respective one of either terminals 52a–i or 56a–i or 58a–i. Terminals 52a–i are all connected to a common line 54 leading to terminal 60. Terminals 56a–i are not connected to any circuit point. Terminals 58a–i are connected to common line 62 leading to and connecting with terminal 64.

In operation, a user sets each of the switches 46a–i, connecting terminals 48a–i with a respective one of either terminals 52a–i, 56a–i or 58a–i according to a predetermined user code representing a particular modulation format for activating a selected garage door opener receiver. The microprocessor assembly 20 then scans the various terminals 46a–i to determine their connection to either terminal 60 or 64, or if not either 60 or 64, to the default setting of 56a–i. This information gives the microprocessor assembly 20 direction to output the required modulation format.

Figure 3:
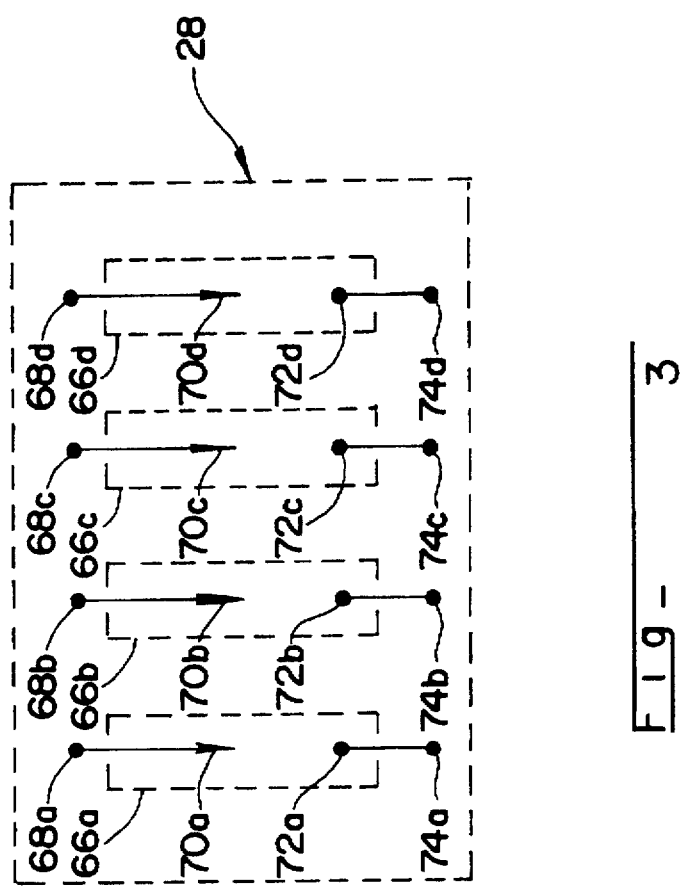
FIG. 3 is a schematic of a second switching unit.

Referring now to FIG. 3, second switching unit 28 is shown to include a plurality, and preferably four, single pole, single throw switches 66a–d. Each switch 66a–d has a terminal 68a–d connected to a moveable contact 70a–d, adjustable to engage or disengage with a second contact 72a–d, which is shown connected to terminal 74a–d. Although four single pole, single throw switches 66a–d are shown, the invention may include any greater or lessor number of single pole single throw switches as desired.

In operation, a user sets each of the switches 66a–d, connecting or disconnecting a respective terminal 68a–d to a respective terminal 74a–d, according to a predetermined sequence representing a particular transmitter carrier frequency for a garage door opener receiver. The microprocessor assembly 20 then scans the terminals 68a–d relative to terminals 74a–d. This information gives the microprocessor assembly 20 direction to output the modulation on the appropriate one of buses 12a–n leading to the required transmitter 10a–n, and to select the required line of bus 30 to the DAC 36 for tuning of the selected transmitter 10a–n, as described above with reference to FIG. 1.

Figure 4:
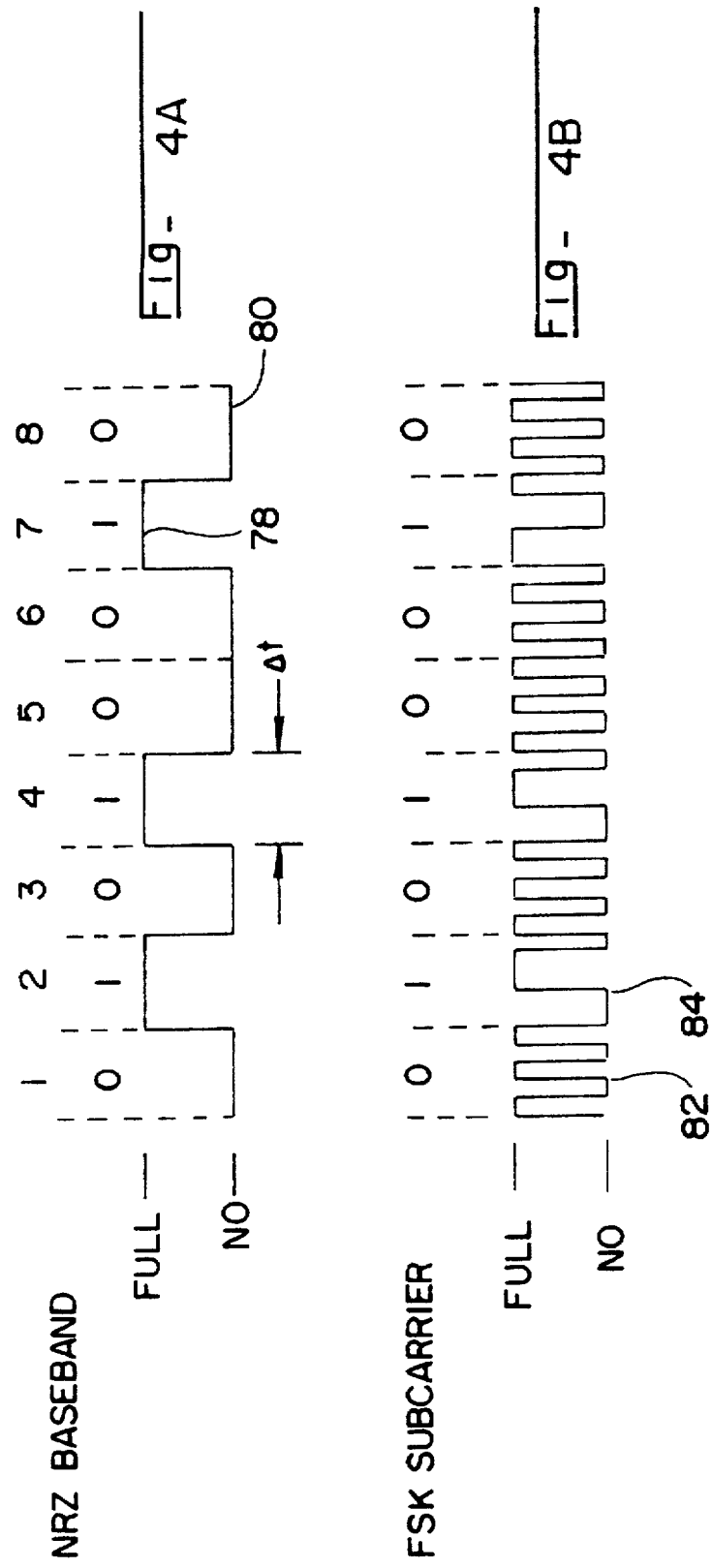
FIG. 4A illustrates the NRZ baseband modulation format.
FIG. 4B illustrates the FSK subcarrier modulation format.

Referring now to FIGS. 4A and 4B, there are depicted two different types of modulation formats generated by the microprocessor assembly 20. FIG. 4A shows what is known as NRZ baseband modulation. As is readily apparent from FIG. 4A, NRZ baseband modulation consists of turning the carrier frequency off and on for specific time intervals. At. There is depicted an eight section sequence, the sequence being repeated continuously during transmitter operation. The length $\Delta t$ of each interval is determined by a clock frequency generated within the microprocessor assembly 20 of FIG. 1. The modulation signal levels shown as "full" 78 and "no" 80 for each $\Delta t$ are determined by a preprogrammed modulation format in the microprocessor assembly 20. The "zeros" and "ones" above the wave form simply represent the "no" or "full" levels of the modulation signal in this case. Although eight intervals are shown, it is understood that the exact number may be varied as desired, depending on the number of switches which are selected.

FIG. 4B shows a format known as FSK sub carrier modulation. As in the above NRZ baseband modulation, the format is one of repetitive sequences of intervals. This is a modulation format wherein separate modulation frequencies are imposed on the carrier frequency and sustained over the time interval $\Delta t$. A first modulation frequency 82 and a second modulation frequency 84 are shown, the choice of frequency for each consecutive interval depending upon a preprogrammed modulation format in the microprocessor assembly 20. The zeros and ones shown above the wave form in this case represent the different modulation frequencies. Although eight intervals are used for the present description, it is understood that any useful number of intervals and switches, and any useful number of different modulation frequencies are included in the spirit of the invention.

Figure 5:
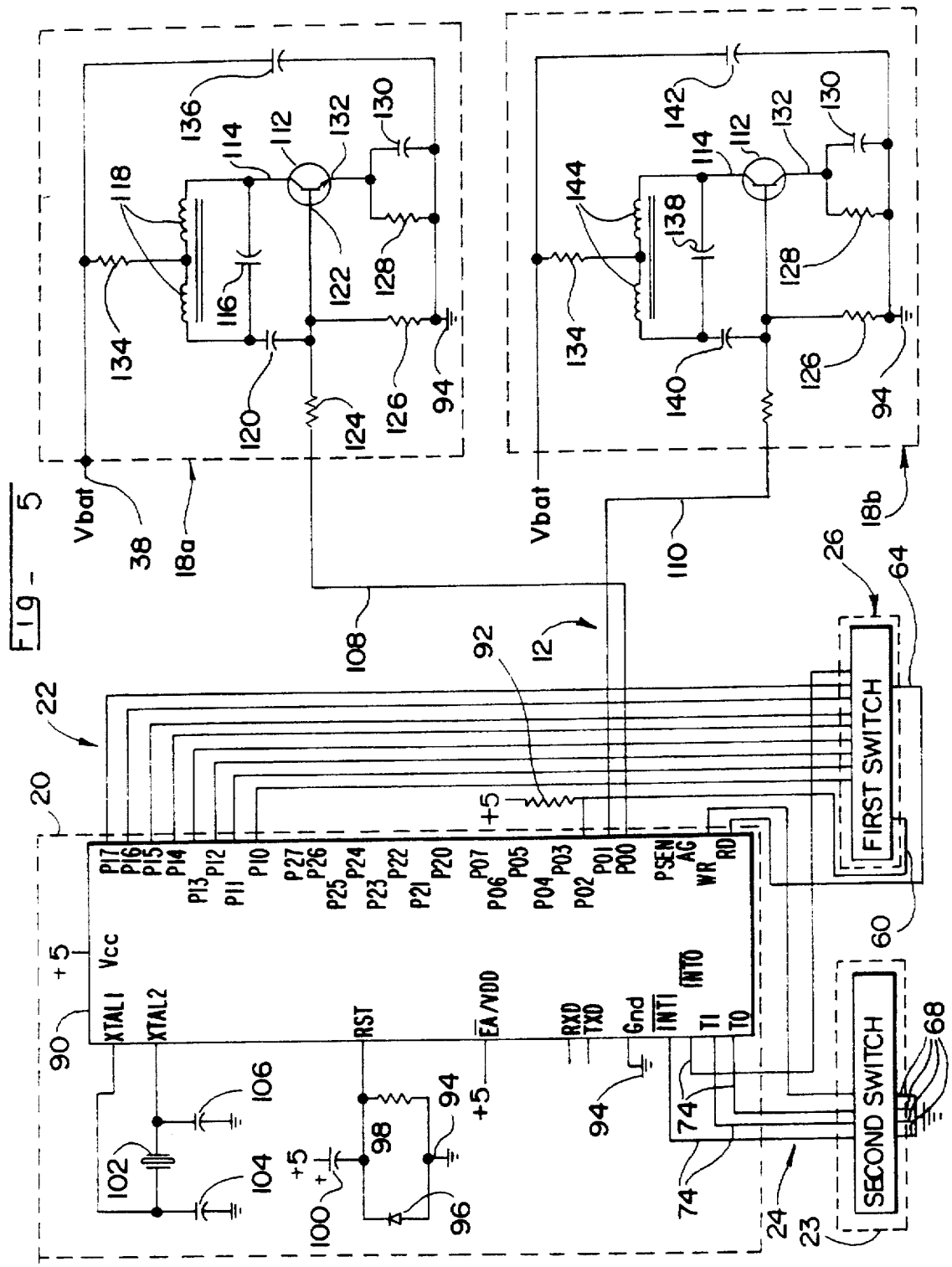
FIG. 5 is a detailed schematic of an embodiment of the present invention.

Referring now to FIG. 5, there is shown a more detailed illustration of an example embodiment of the invention. As described previously, the major components include the microprocessor assembly 20, first and second switching units 26 and 28, and two transmitters 18a and 18b. For purposes of brevity in the illustration, the following is limited to the description of a universal device having only two transmitters 18a, 18b. It will be readily apparent, however, that any desired number of transmitters may be employed as practicable in view of their similarity in design and operation.

The microprocessor assembly 20 is shown to include an 8051 microprocessor 90, with bus line connections (designated generally at 22) to 8051 microprocessor terminals P10–P17, P02 and RD. P02 also is connected to a +5 v line through a resistor 92. Terminals INT1, INT0, T1 and T0 are connected to bus 24 (see FIG.1), and terminal Gnd is connected to ground 94. Terminals EA/VDD and Vcc are powered by a +5 v source (not shown). The RST terminal is connected to the negative lead of a diode 96 and a resistor 98, the opposing terminals connected to ground 94, and also connected to the negative lead of an electrolytic capacitor 100 with the opposite lead connected to a +5 v source.

The microprocessor assembly 20 has XTAL1 and XTAL2 terminals with a crystal 102 connected between them, and capacitors 104 and 106 connected between terminals XTAL1 and XTAL2 to ground. Terminals P01 and P00 of microprocessor 90 are connected to lines 108 and 110 of bus 12 to the two transmitters 18a and 18b. First switching unit 26 has terminals labeled 0–8 and terminals 60 and 64 all connected to bus line 22 to the microprocessor 90. Second switching unit 28 has terminals 74 numbered 1–4 connected to bus 24, and terminals 68 connected to ground 94. The choice of an 8051 microprocessor is for illustrative purposes only, and should be understood that the invention contemplates the use of other known processor types as well as custom integrated circuits, for achieving the same purpose.

The transmitter 18a has a transistor 112 with collector 114 connected to one end of a parallel combination of capacitor 116 and inductor 118, the other end of the combination being connected to one side of capacitor 120, and the other side of capacitor 120 being connected to the base 122 of transistor 112. One end of a resistor 124 is connected to the base 122 and the other lead to the modulation line 108 from microprocessor 90. Resistor 126 is connected between base 122 and ground 94, and a parallel combination of resistor 128 and capacitor 130 is connected between the emitter 132 and ground 94. There is terminal 38 that is connected to a power source (not shown) and a resistor 134 interconnecting the source to the center of inductor 118. Also, there is a capacitor 136 connected between the terminal 38 and ground 94.

The component layout of transmitter 18b is substantially identical to that of transmitter 18a with the majority of the individual components having the same or similar value and are accordingly noted by the same reference numerals, with the exception of the values for capacitors 138, 140, 142 and inductor 144 which are to be adjusted to generate power at a different frequency.

Referring again to the transmitter 18a, in operation, resistor 134 and capacitor 136 provide a low pass filter isolation between the supply terminal 38 and the active radio frequency transmitter circuitry. The positive feedback for oscillation is provided between the collector 114 and base 122 of the transistor 112 by the parallel combination of capacitor 116 and inductor 118, and the series capacitor 120. The DC (direct current) operating point of the transmitters 18a and 18b is determined by resistors 134 and 128 in the collector and emitter circuits. Resistors 124 and 126 provide a voltage division to the applied modulation signal for adjusting the base voltage to the proper values in order to turn the transistor to the on or off position. The inductive coil 118 serves the dual purpose of an antenna for radiating the signal to the garage door opener receiver. The specific transmitter circuitry shown is for illustrative purposes, and the invention includes other forms well known to those skilled in the art.

Returning now to the microprocessor assembly 20, the function of crystal 102 is to set the clock frequency. Capacitors 104 and 106 serve to match impedance between the crystal 102 and the microprocessor 90. The function of capacitor 100 and resistor 98 is to provide a time delayed start up of the microprocessor 90. A voltage applied to capacitor 100 is transformed immediately to the RST port which temporarily disables the microprocessor 90. When the time constant of capacitor 100 and resistor 98 cause the voltage on RST to drop to a certain level, the microprocessor 90 is turned on. Diode 96 serves to protect the microprocessor 90 from reverse voltage transients. The purpose of the delayed start up of the microprocessor 90 is to allow all circuit components to come up to voltage before operation after the application of power, and thereby avoid unstable circuit conditions which may occur as the voltage rises throughout the circuitry.

The overall operation of the embodiment of FIG. 5 is similar to that of FIG. 1. A user, having determined the required transmitter frequency and user code, sets the second switching unit 28 and first switching unit 26 positions. When the power is applied (switch and supply not shown) the time delay network, comprised of capacitor 100 and resistor 98, disables the microprocessor 90 for a short interval allowing the other microprocessor components to come up to voltage. The microprocessor 90 then turns on and begins its operational sequence timed by crystal 102. The first switching unit 26 and second switching unit 28 are scanned to determine the transmitter type and therefore transmitter frequency, and to determine the user code specifying the modulation format. The microprocessor 90 then sends the correct modulation over either line 108 or 110 as required to activate transmitter 18a or 18b depending on which transmitter frequency is specified. As described in detail with reference to FIG. 1 and the following, the invention also includes application of transmitter tuning, and any number of individual transmitter units.

Figure 6:
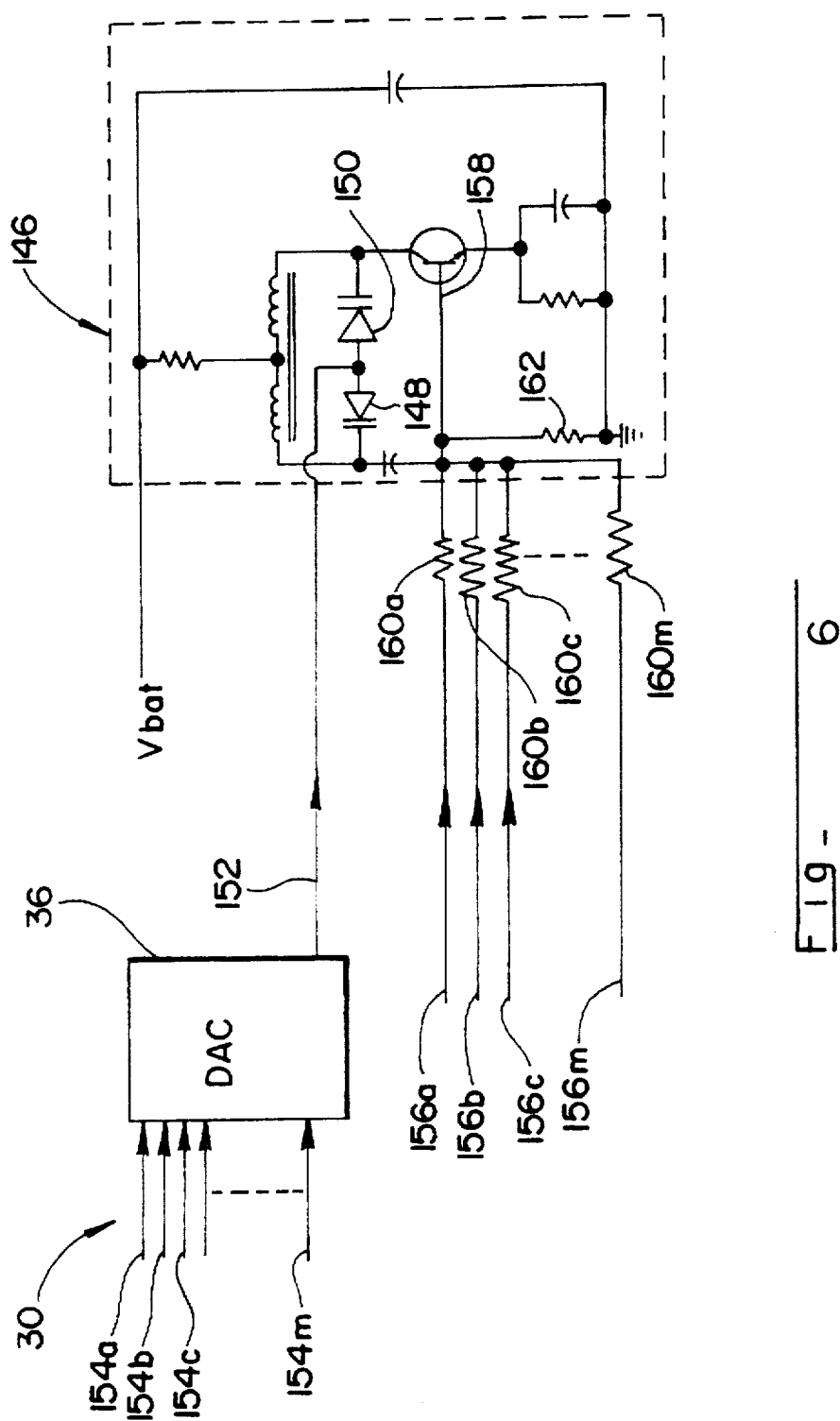
FIG. 6 is a detailed illustration of apparatus for tuning the transmitter frequency.

Referring now to FIG. 6, there is shown a more detailed illustration of the use of a digital to analog converter 36 to fine tune a transmitter frequency as described above with reference to FIG. 1. There is also illustrated a means for adjusting the output power of the transmitter.

The elements of the transmitter 146 are the same as depicted in FIG. 5 except that capacitor 116 of FIG. 5 is replaced with two diodes 148 and 150, the anodes of which are connected together and have a bias line 152 connected thereto supplying tuning voltage from the DAC 36. The bus 30 to the DAC 36 is shown to contain a plurality of lines 154a–m of any useful number according to the number of frequencies to be selected. FIG. 6 also shows input lines 156a–m, carried by bus 12 of FIG. 1, and connected to the base 158 through series resistors 160a–m, the number of input lines 156a–m and resistors 160a–m again being of any useful number.

The diodes 148 and 150 provide a capacitance value that is dependent on the voltage applied across them, being the difference between the voltage on line 152 and the supply voltage Vbat. Since the frequency of the transmitter 146 depends on the value of capacitor 116, as described in connection with FIG. 5, the replacement of capacitor 116 with variable capacitance diodes 148 and 150 provides for transmitter frequency adjustment.

The DAC 36 respond s to input on one of lines 154a–m of bus 30 by providing a bias voltage on line 152 of value depending on which of lines 154a–m of bus 12 is activated by the microprocessor assembly 20.

The input lines 156a–m and resistors 160a–m function in cooperation with the power sensing circuit 114 of FIG.1 and microprocessor assembly 20 of FIG. 1 to compensate for a reduction in battery voltage to keep the transmitter power constant by increasing the bias on base 158. Each resistor 160a–m has a distinct value, and in combination with the single resistor 162 divides the modulation signal from the microprocessor 90 to a desired level at the base 158. The power sensing circuit 42, in cooperation with the microprocessor assembly 20, selects one of lines 156a–m, upon which to send the modulation signal in order to maintain the transmitter power.

Figure 7:
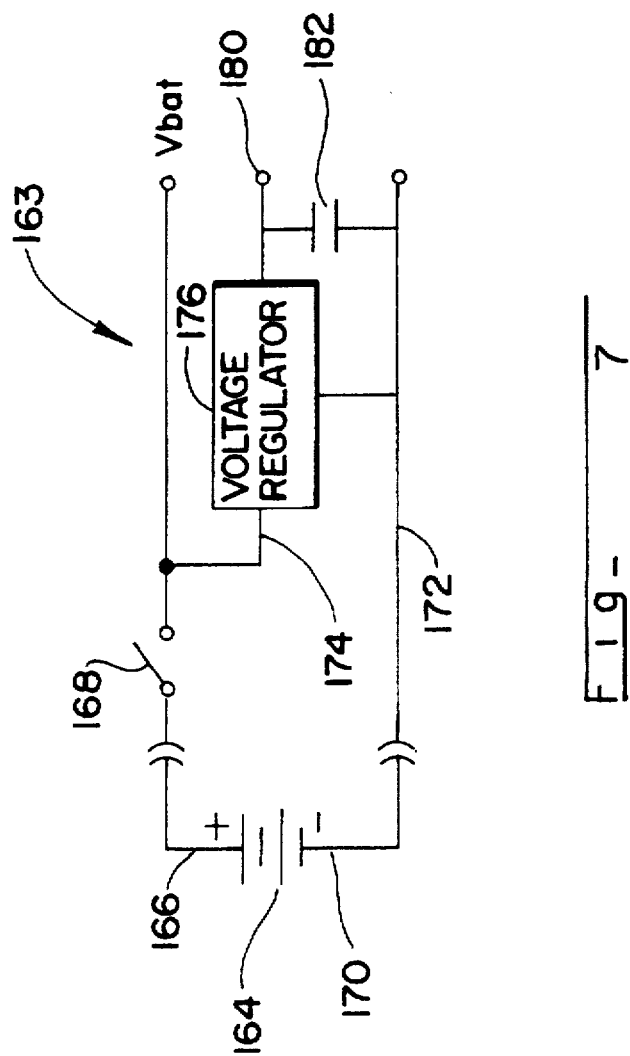
FIG. 7 is a schematic of a voltage regulated power supply.

Referring now to FIG. 7, there is shown an example of a regulated power source 163. As mentioned above, any of various types of sources and regulation methods can be used, and these are well known to those skilled in the art. FIG. 7 shows a battery 164 having a positive terminal 166 connected to switch 168, and negative terminal 170 connected to ground 172. The switch 168 outputs to an input 174 of a regulator 176, which has a terminal 178 connected to ground and an output terminal 180. A capacitor 182 is attached between output 182 and ground 172. The Vbat terminal 183 is connected to the transmitter supply input terminal 38, and the +5 v terminal 180 is connected to all +5 v system input terminals as required.

In operation, a power source, represented by battery 164, is connected to a voltage regulator 176 by way of a switch 168. The output of the regulator 176 is further filtered by capacitor 182.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A universal remote control radio frequency (RF) transmitter having a power output level, the transmitter for selective actuation of one of a plurality of receiver units, each receiver unit receiving a particular carrier frequency modulated according to a particular modulation code, the universal remote control transmitter comprising in operative combination:

a) a first switching unit including a plurality of switches, each switch having at least three user selectable settings, the switches of the first switching unit set by the user to a selected one of a plurality of combinations of settings, each combination corresponding to one of a plurality of modulation codes;

b) a second switching unit having a plurality of user selectable settings, a particular second switching unit setting set by the user to select one of a plurality of possible carrier frequencies;

c) transmitter circuit means for transmitting a carrier frequency by transmitting the selected one of the plurality of possible carrier frequencies; and d) controller means responsive to the first switching unit for selective actuation and modulation of the transmitter circuit means, the controller means comprising:

(i) means responsive to selected switch settings of the first switching unit for outputting a modulation signal corresponding to the modulation code for modulating the carrier frequency, and (ii) means responsive to the particular second switching unit setting for activating the transmitter circuit means to transmit the selected one of the plurality of possible carrier frequencies.

2. A universal remote control RF transmitter as recited in claim 1 wherein said transmitter circuit means includes a plurality of transmitter circuits, each of said transmitter circuits for transmitting a particular one of said plurality of possible carrier frequencies.

3. A universal remote control RF transmitter as recited in claim 2 a) wherein each of said plurality of transmitter circuits operates within a specified bandwidth of carrier frequencies; and b) further comprising means responsive to said controller means for selecting and tuning one of said transmitter circuits to said selected carrier frequency within said specified bandwidth.

4. A universal remote control RF transmitter as recited in claim 3 wherein:

a) each of said transmitter circuits includes at least one varactor diode; and
   b) said means responsive to said controller means includes a plurality of digital outputs from said controller means for conveying digital bias information to a digital-to-analog converter (DAC) means responsive to said digital bias information for outputting analog bias signals to at least one of said varactor diodes for tuning a particular selected transmitter circuit.

* * * * *